March 5, 1935.   J. A. JOHNSON   1,993,329
CONTAINER
Filed Dec. 27, 1933
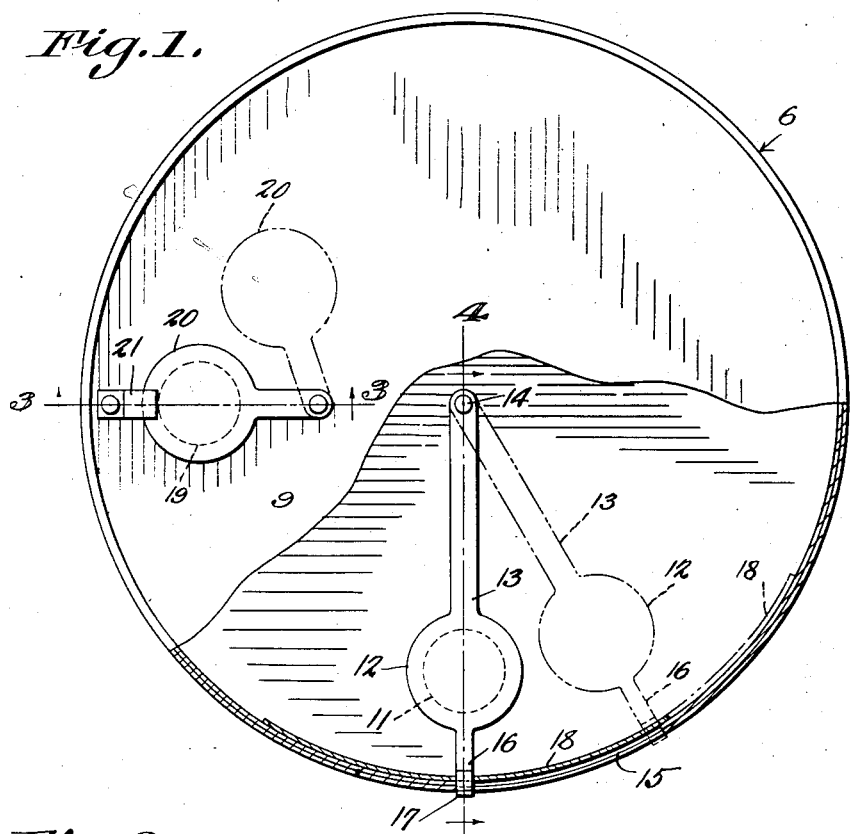
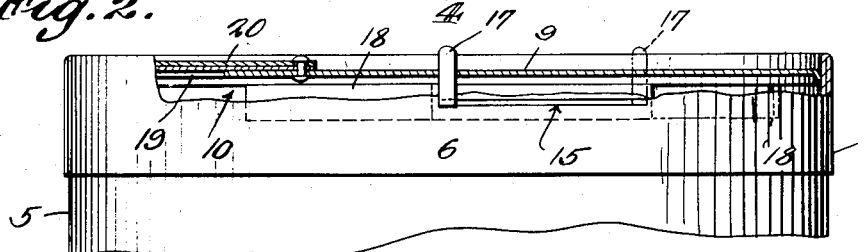
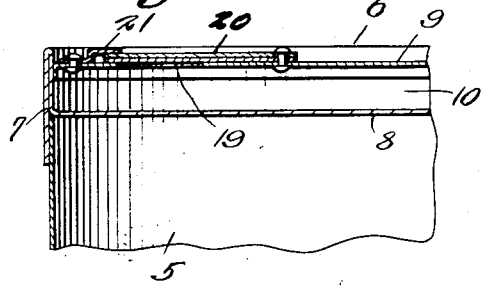
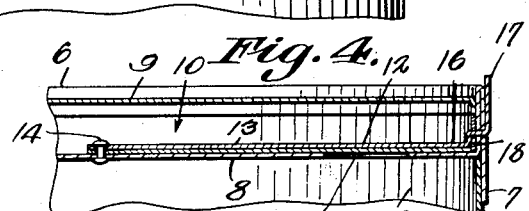
John A. Johnson
Inventor

UNITED STATES PATENT OFFICE 1,993,329

CONTAINER

John A. Johnson, North Mankato, Minn.

Application December 27, 1933, Serial No. 704,170

2 Claims. (Cl. 221—110)

This invention relates to covers for use in connection with containers that are designed primarily for containing coffee.

The important object of the invention is to provide a container of this character, which will permit quantities of the coffee in the container to be removed without exposing the contents of the container to the atmosphere, to the end that the coffee in the container will be maintained in a fresh condition at all times.

Another object of the invention is to provide a cover which may be readily and easily positioned on the container, supplementing the usual cover of the container, the improved container embodying a chamber into which the coffee may pass when the can is inverted, means being provided to permit the contents of the chamber to be removed, thereby insuring predetermined quantities of coffee being removed with each operation of the closures, that control the passage of material to and from the chamber.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a container provided with a cover constructed in accordance with the invention, a portion of the cover being broken away.

Figure 2 is a fragmental elevational view of a container equipped with a cover, a portion of the cover being broken away.

Figure 3 is a sectional view taken on line 3—3 of Figure 1.

Figure 4 is a sectional view taken on line 4—4 of Figure 1.

Referring to the drawing in detail, the can or container is indicated generally by the reference character 5, and the cover, forming the subject matter of this invention, is indicated by the reference character 6. This cover is circular in formation and embodies a wide flange 7 adapted to fit over the upper end of the container, and grip the upper end of the container in such a way that it will not be accidentally displaced.

As clearly shown by the drawing, the cover includes a lower wall 8 and an upper wall 9, spaced from the wall 8 providing a compartment or chamber 10 into which material passes from the container 5, from where it may be removed without admitting air to the contents of the can or container 5.

An opening, indicated by the reference character 11, is provided in the wall 8, which opening is normally closed by means of the sliding closure 12 that is formed with arms 13 pivotally connected to the wall 8, at 14.

The flange 7 is formed with an elongated opening 15 through which the arm 16 of the closure 12, extends, the arm 16 having an upstanding end 17 that may be gripped by the operator, to slide the closure 12 to its open or closed position.

In order that material that has passed through the chamber 10 will be prevented from passing through the elongated opening 15, a curved plate 18 is provided, and rubs the inner surface of the cover, the plate being carried by the arm 16, so that it moves over the elongated opening, closing the elongated opening at all times.

The upper wall 9 of the cover is in the form of a disc fitted within the upper portion of the cover, and as shown, this upper wall is formed with an opening 19, through which material may pass from the container.

A pivoted closure indicated at 20 is mounted on the cover and is of a construction to normally close the opening 19.

Positioned on the cover, adjacent to the closure 20, is a clip 21, under which the closure 20 passes and is held in its active position by its contact with the clip 21.

In the use of the device the closure 12 is moved away from the opening at 11, and the container is inverted, allowing the coffee in the container to pass into the chamber 10. The closure 12 is now moved to close the opening 11 and the closure 20 is operated to permit the material held within the chamber 10 to pass therefrom.

In this way the contents of the can may be removed without exposing the contents of the can to the atmosphere, thereby insuring the coffee in the container being maintained in a fresh condition at all times.

Having thus described the invention, what is claimed is:

1. The combination with a container, of a cover for the container, comprising a circular body portion, spaced upper and lower walls closing the top and bottom of the body portion and spaced apart providing a compartment, the body portion extending below the lower wall, providing a flange to fit over the container, said upper and lower walls having discharge openings, the openings being spaced apart laterally an appreciable distance, the independently closed closures adapted to control the passage of material through the openings.

2. The combination with a container, of a cover for the container, comprising a circular body portion, spaced upper and lower walls fitted within the body portion and providing a compartment and a flange, said lower wall having openings near the edge thereof, through which material passes from the container to the compartment, a sliding closure adapted to control the passage of material into the compartment, an arm extending inwardly from the closure and having pivotal connection with the lower wall near the center of the wall, an arm extending outwardly from the closure and passing through a slot in the body portion to be gripped by the operator in operating the closure, said upper wall having an opening through which material passes from the compartment, and a closure for the last mentioned opening.

JOHN A. JOHNSON.